United States Patent
George et al.

(10) Patent No.: US 8,050,928 B2
(45) Date of Patent: Nov. 1, 2011

(54) SPEECH TO DTMF GENERATION

(75) Inventors: David George, Sterling Heights, MI (US); Rathinavelu Chengalvarayan, Naperville, IL (US); Scott M. Pennock, Lake Orion, MI (US); Jason W. Clark, Grosse Pointe Woods, MI (US)

(73) Assignee: General Motors LLC, Detroit, MI (US)

( * ) Notice: Subject to any disclaimer, the term of this patent is extended or adjusted under 35 U.S.C. 154(b) by 1009 days.

(21) Appl. No.: 11/944,856

(22) Filed: Nov. 26, 2007

(65) Prior Publication Data

US 2009/0138264 A1    May 28, 2009

(51) Int. Cl.
*G10L 21/06* (2006.01)
(52) U.S. Cl. ......................... 704/270; 704/251
(58) Field of Classification Search .................. 704/270, 704/251
See application file for complete search history.

(56) References Cited

U.S. PATENT DOCUMENTS

| | | | | |
|---|---|---|---|---|
| 6,493,670 B1* | 12/2002 | Croft | | 704/270 |
| 6,601,031 B1* | 7/2003 | O'Brien | | 704/270.1 |
| 6,868,142 B2* | 3/2005 | Gupta et al. | | 379/88.04 |
| 7,092,515 B2* | 8/2006 | Gierachf | | 379/406.01 |
| 7,260,535 B2* | 8/2007 | Galanes et al. | | 704/270 |
| 7,409,349 B2* | 8/2008 | Wang et al. | | 704/270.1 |
| 7,506,022 B2* | 3/2009 | Wang et al. | | 709/203 |
| 7,610,547 B2* | 10/2009 | Wang et al. | | 715/205 |
| 7,711,570 B2* | 5/2010 | Galanes et al. | | 704/277 |
| 2005/0216268 A1* | 9/2005 | Kannappan | | 704/270 |

* cited by examiner

*Primary Examiner* — Susan McFadden
(74) *Attorney, Agent, or Firm* — Anthony L. Simon; Reising Ethington P.C.

(57) ABSTRACT

A method of speech to DTMF generation involving ASR-enabled and DTMF-controlled communications systems. The ASR-enabled system is used to recognize speech received from the DTMF-controlled telecommunications system using sampling rate independent speech recognition. It then identifies a speech segment contained in the speech received from the DTMF-controlled system that corresponds with at least one keyword associated with user-defined data. Then, the ASR-enabled system transmits at least one DTMF signal to the DTMF-controlled system in response to the identified speech segment. This allows a user of an ASR-enabled system such as a vehicle telematics unit to at least partially automate access to the DTMF-controlled system using the telematics unit, so that voice mailbox numbers, passwords, and the like normally entered via a telephone keypad can be automatically sent to the DTMF-controlled system from the telematics unit without having to be manually input each time by the user.

19 Claims, 4 Drawing Sheets

SPEECH TO DTMF GENERATION

TECHNICAL FIELD

This invention relates to speech signal processing, and more specifically DTMF-controlled communications systems.

BACKGROUND OF THE INVENTION

Presently, telecommunications users encounter an increasing amount of automated interaction with information providers. Voicemail systems, banking and financial services, news services and other similar sources frequently employ a strategy where a user responds to an automated voice using a telecommunications device. Often, users connect with one of the aforementioned providers and only interact with an automated voice. The automated voice prompts the user to generate commands either using the user's voice or by pressing switches on their telecommunications device to generate a dual-tone multiple frequency (DTMF) signal thereby conveying the user's intent to the information provider.

Many times, responding to automated voice prompts is a repetitious chore and users prefer to minimize their input. Nametag storage reduces some of the burdensome aspects of accessing voicemail. Nametags are mnemonics for phone numbers and other data used to access remote systems. Users create a nametag in a separate session, recording data such as phone numbers and associating the data with the nametag. When a user wants to make a call, the user utters the nametag, an automatic speech recognition program recognizes the nametag and associates the nametag with the recorded data, such as a telephone number, and dials the number.

Often, DTMF-controlled systems require a degree of interaction with the user, making nametag storage for such systems more complex. For instance, a voicemail system requires several fields, such as the phone number of the voicemail system, the mailbox number, and a passcode identifying the individual, authorized user. If a user knows the duration and timing of particular voice prompts generated by a particular voicemail system the user is accessing, the user can input DTMF key sequences interspersed with fixed pauses to automatically interact with the particular system. The fixed pauses pass time between DTMF signals and coincide with the automatically generated voice prompt provided by the information provider.

But coordinating number strings or DTMF key sequences and pauses for automated interaction with DTMF-controlled systems presents some problems. Stored number strings or DTMF key sequences interspersed with fixed pauses cannot anticipate the wide variety of DTMF-controlled systems, which are unable to respond to varying automated inquiries. Additionally, the varying time duration of prompts from DTMF-controlled systems further complicates accurately placing pauses for automated interaction. Users have used experimentation to determine the position required for fixed pauses and the pause duration. While fixed pauses have been used in the past, these pauses must be precisely positioned, and even if precisely positioned the pauses will only function with specific systems.

SUMMARY OF THE INVENTION

According to one aspect of the invention, there is provided a method of speech to DTMF generation using sampling rate independent speech recognition. The method includes receiving speech from a DTMF-controlled telecommunications system, recognizing the speech received from the DTMF-controlled telecommunications system using sampling rate independent speech recognition, identifying a speech segment contained in the speech received from the DTMF-controlled telecommunications system that corresponds with at least one keyword associated with user-defined data, and transmitting at least one DTMF signal to the DTMF-controlled telecommunications system in response to the speech received from the DTMF-controlled telecommunications system using the user-defined data.

According to another aspect of the invention, there is provided a method of communicating between an automatic speech recognition (ASR) enabled telecommunications system and a DTMF-controlled communications system. The method includes establishing communication between the ASR-enabled telecommunications system and the DTMF-controlled communications system, detecting a presence of speech energy at the ASR-enabled telecommunications system from the DTMF-controlled communications system, detecting an absence of the speech energy at the ASR-enabled telecommunications system from the DTMF-controlled communications system, and transmitting at least one DTMF signal from the ASR-enabled telecommunications system to the DTMF-controlled telecommunications system in response to the detected absence of speech energy.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
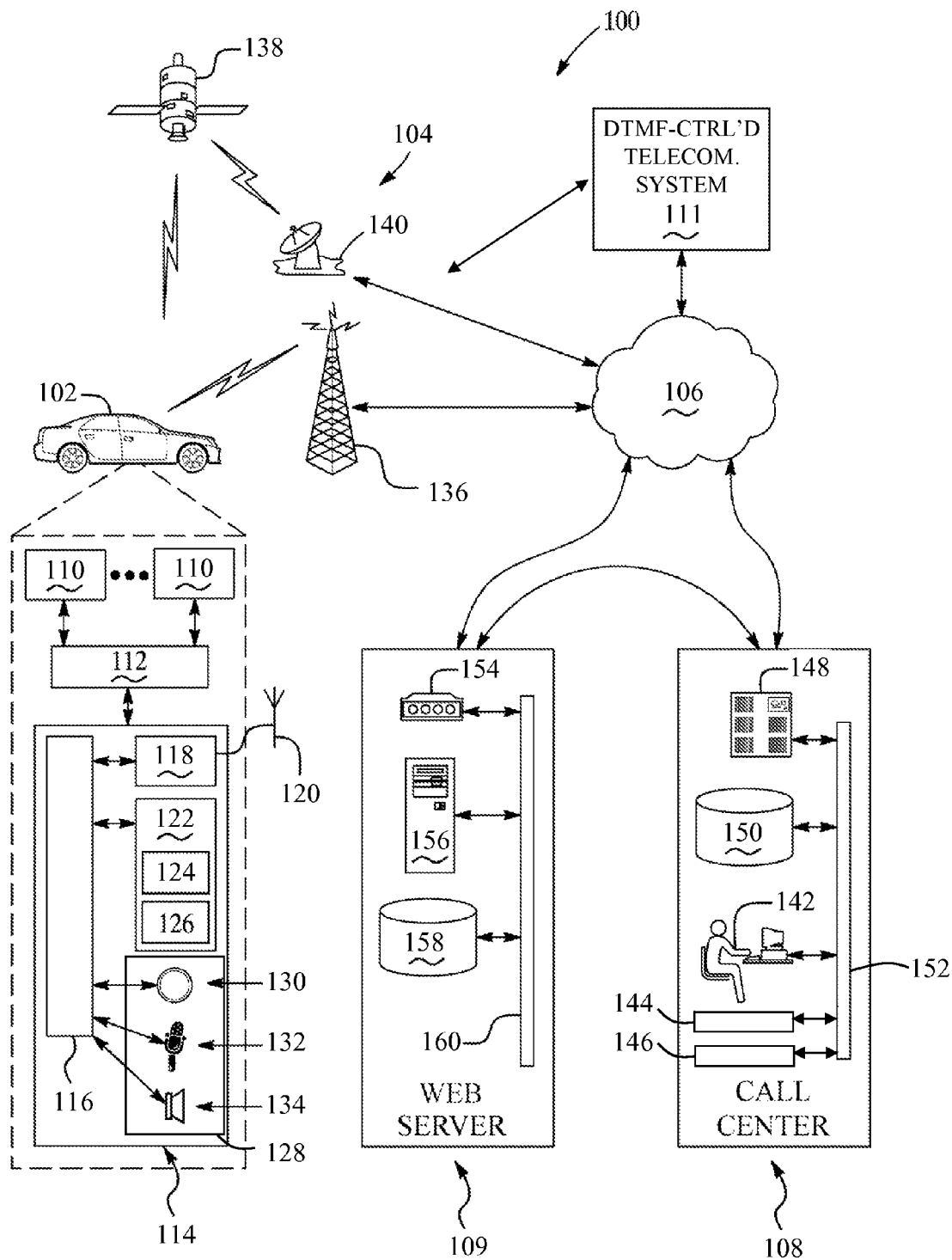
FIG. 1 is a block diagram depicting an example of a telematics system that can be used to implement exemplary methods of communication.

An exemplary operating environment is illustrated in FIG. 1, and can be used to implement presently disclosed methods of speech to DTMF generation. The methods can be carried out using any suitable telematics system and, preferably, are carried out in conjunction with a vehicle telematics system such as system 100. Those skilled in the art will appreciate that the overall architecture, setup, operation, and individual components of the system 100 are generally known in the art. Thus, the following system description simply provides a brief overview of one such exemplary telematics system, but other systems and components not shown here could also support the presently disclosed method.

The exemplary telematics system 100 includes a vehicle 102 for carrying one or more occupants or users, and a wireless communication system 104 for providing wireless communication to and from the vehicle 102. Also, the system 100 can include a second communications system 106 for communicating the wireless communication system 104 with a call center 108 of the system 100 that provides services to the vehicle 102. Further, the system 100 can include a web server 109 in communication with the vehicle 102 and/or the call center 108 for providing Internet services thereto.

The system 100 can generally facilitate one or more suitable services for vehicle occupants such as vehicle navigation, turn-by-turn driving directions, infotainment, emergency services, vehicle diagnostics, vehicle system updates, and hands-free telephony and vehicle interaction using automatic speech recognition. For this purpose, the system 100 processes data and instructions as well as facilitates wireless voice and data transfer between hardware located on the vehicle 102 and hardware in the remote call center 108. For example, the system 100 enables vehicle occupants to initiate voice communication with the call center 108 or the service center 111. Also, the system 100 enables data communication between the vehicle 102 and the web server 109 for various purposes such as transmitting and/or receiving data such as voice messages, email, news, Internet content, and/or the like.

Vehicle

The vehicle 102 is depicted in the illustrated embodiment as a passenger car, and it will be appreciated that any other vehicles including motorcycles, marine vessels, aircraft, recreational vehicles, and other automobiles such as vans, trucks, or the like, can be used without departing from the scope of the invention. Various electronic modules can be located on the vehicle 102 and include one or more vehicle system modules (VSMs) 110, an on-board vehicle communication bus 112, and one or more vehicle telematics units 114 connected by the bus 112 to the VSMs 110.

The VSMs 110 facilitate any suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent any software, electronic, or electromechanical subsystems, and related sensors or other components throughout the vehicle with which the telematics unit 114 interacts. In a specific example, if the call center 108 sends a signal to the vehicle 102 to unlock the vehicle doors, then the telematics unit 114 instructs an electromechanical door lock VSM to unlock the doors.

The vehicle communication bus 112 facilitates interactions among various vehicle systems, such as the VSMs 110 and/or the telematics unit 114, and uses any suitable network communication configuration whether wired or wireless. Suitable interfaces can be interposed between the bus 112 and the various vehicle systems. As used herein, the term interface broadly means any suitable form of electronic device or adapter, or even a software module or adapter, to enable one piece of equipment to communicate with or control another piece of equipment. A few examples of buses include a Controller Area Network (CAN), Media Oriented System Transport (MOST), Local Interconnect Network (LIN), Ethernet (10baseT, 100baseT), Local Area Network (LAN), a wireless area network (WAN), and/or any suitable International Standard Organization (ISO) or Society of Automotive Engineers (SAE) communication standards.

The vehicle telematics unit 114 facilitates communication and other services between the vehicle 102 or occupants thereof, and various remote locations including the call center 108. The telematics unit 114 interfaces with the various VSMs 110 via the vehicle communication bus 112. The telematics unit 114 can be implemented in any suitable configuration, but can include a processor 116, a communications device 118 for wireless communication to and from the vehicle 102 via one or more antennas 120, a memory 122 to store computer programs 124 and/or one or more databases 126, and a user interface 128. The telematics unit 114 also includes any suitable interface(s) for intercommunicating the aforementioned devices.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSMs 110 are shown separate from the telematics unit 114, it is possible for any combination of these VSMs 110 to be integrated within the telematics unit 114. Furthermore, the telematics unit 114 could include additional components not shown, or could omit some of the components shown.

The telematics processor 116 is implemented in any of various ways known to those skilled in the art such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices and/or modules (not shown) such as a real time clock device to provide accurate date and time information, and/or a timer module to track time intervals.

The processor 116 executes the one or more programs 124 stored in memory 122 to carry out various functions such as system monitoring, data processing, and communicating the telematics unit 114 with the VSMs 110, vehicle occupants, and remote locations. For example, the processor 116 can execute one or more control programs and processes programs and/or data to enable methods of speech to DTMF generation, either alone or in conjunction with the call center 108. In another example, the processor 116 controls, generates, and accepts signals transmitted between the telematics unit 114 and call center 108, and between the telematics unit 114 and the vehicle communication bus 112 that is connected to the various VSMs 110. In one mode, these signals are used to activate programming and operation modes of the VSMs 110.

The telematics memory 122 can be any electronic storage device that provides computer-readable storage of data and programs for use by the processor 116. The memory 122 can include volatile, and/or non-volatile memory storage such as RAM, NVRAM, hard disks, flash memory, and/or the like, and can be implemented as one or more separate physical devices. The programs 124 include one or more computer programs that are executed as instructions by the processor 116 to carry out various functions of the telematics unit 114 such as messaging, diagnostics, communication, speech recognition, and/or the like. For example, the programs 124 resident in the memory 122 and executed by the processor 116 can be used to enable methods of speech to DTMF generation. The database 126 can be used to store message data, diagnostic trouble code data or other diagnostic data, vehicle data upload (VDU) records, event activation tables, speech recognition data, and/or the like. The database 126 can be implemented as database tables that enable lookups to be performed on data stored in the database 126, and this can be done using known indexing techniques, database queries, straight serial searching through such tables, and/or any other suitable storage and lookup techniques.

The telematics communications device 118 and associated antenna 120 transmits and receives voice and data to and from the wireless communication system 104 so that the telematics unit 114 can communicate with the call center 108 such as via the second communication system 106. The communications device 118 provides such wireless communication via cellular, satellite, and/or other wireless path, and can facilitate voice and/or data communication, wherein both voice and data signals can be sent and received over a voice channel and/or vice-versa. Those skilled in the art will recognize that the communications device 118 can transmit and receive data over a voice channel by applying any suitable type of encoding or modulation to convert digital data for communication through a vocoder or speech codec incorporated in a cellular chipset. Any suitable encoding or modulation technique that provides an acceptable data rate and bit error rate can be used. The communications device 118 can include any other suitable modules as discussed below.

The communications device 118 can include a telephony module including communications software and hardware such as a wireless modem and/or a mobile telephone. The mobile telephone can be any suitable wireless telephony device such as a mobile telephone, which can be analog, digital, dual mode, dual band, multi-mode, and/or multi-band. The mobile telephone can include a separate processor and memory, and/or a standard cellular chipset. Moreover, the mobile telephone can use any suitable cellular technology such as Advanced Mobile Phone System (AMPS), code division multiple access (CDMA), time division multiple access (TDMA), Global System for Mobile communications (GSM), or the like, but could also utilize proprietary or other wireless technologies to communicate with the wireless communication system 104.

The telematics user interface 128 includes one or more input and output interfaces to receive input from, and transmit output to, telematics users. As used herein, the term user includes telematics service subscribers, vehicle occupants including drivers and passengers, and the like. Also, as used herein, the term user interface broadly means any suitable form of electronic device or adapter, or even a software module or adapter, which enables vehicle occupants to communicate with or control another piece of equipment. The user interface 128 can include individual components distributed throughout the vehicle, and/or can be integrated as a single unit such as a human/machine interface (HMI), multi-media center, or the like. Multi-media centers can receive and store downloads of content such as music, webpages, movies, television programs, videogames, or the like, for current or delayed playback.

The input interfaces can include one or more tactile devices 130, one or more microphones 132, or any other types of input technology. First, the tactile input device 130 enables vehicle occupants to activate one or more functions of the telematics unit 114, and can include one or more pushbutton switches, keypads, keyboards, or other suitable input devices located within the vehicle 102 in reach of the vehicle occupants. For example, the tactile input device 130 can be used to initiate telecommunications with remote locations such as the call center 108 or mobile telephones and/or to initiate vehicle updates, diagnostics, or the like. Second, the microphone 132 allows vehicle occupants to provide vocal input to the telematics unit 114, and enables vocal communication with various remote locations via the communications device 118. Vocal input from vehicle occupants can be interpreted using a suitable analog-to-digital interface and/or digital signal processor such as a sound card (not shown) between the microphone 132 and the processor 116, and voice and speech recognition programs and data stored within the memory 122.

The output interfaces can include one or more speakers 134, a visual display device such as a liquid crystal display, plasma screen, touch screen, heads-up display, or the like (not shown), or any other types of visual output technology. The speakers 134 enable the telematics unit 114 to communicate audible speech, signals, audio files, or the like to vehicle passengers, and can be part of a vehicle audio system or stand-alone components specifically dedicated for use with the telematics unit 114. A suitable interface such as a sound card (not shown) can be interposed between the speakers 134 and the telematics processor 116.

Communication System(s)

The communication systems 104, 106 can be implemented separately or can be combined as an integral system. Also, with suitable equipment, the call center 108 can be wirelessly communicated directly to the wireless communication system 104 without the second system 106.

The wireless communication system 104 can include one or more analog and/or digital cellular networks 136, a wireless computer network such as a wide area network (WAN), wireless local area network (WLAN), broadband wireless area (BWA) network, and/or any other suitable wireless network used to transmit voice and/or data signals between the vehicle 102 and various remote locations such as the call center 108. The exemplary cellular network 136 can be implemented as a CDMA, GSM, or other cellular communication network that enables exchange of voice and data between the vehicle 102 and the second communication system 106. The network 136 can include any suitable combination of cell towers, base stations, and/or mobile switching centers (MSC). For instance, a base station and cell tower could be co-located at the same site or they could be remotely located from one another, each base station could service a single cell tower or multiple cell towers, and various base stations could be coupled to a single MSC, to name but a few of the possible arrangements. A speech codec or vocoder can be incorporated in the system 104, such as in one or more of the base stations, but depending on the particular architecture of the wireless network, it could be incorporated within an MSC or some other network component as well.

The system 104 can also or alternatively carry out wireless communication by satellite transmission using one or more satellites 138 allowing the vehicle 102 to communicate with the call center 108 via a ground-based satellite transceiver 140. As an exemplary implementation, the satellite transceiver 140 and satellite(s) 138 can transmit radio signals to the vehicle 102. For example, a satellite transmission can be broadcast over a spectrum in the "S" band that has been allocated by the U.S. Federal Communication Commission for national broadcasting of satellite-based Digital Audio Radio Service (DARS). More specifically, satellite transmission can be carried out using XM™ brand satellite radio services.

The second communication system 106 can be a land-based wired system such as a public switched telephone network (PTSN), Internet Protocol (IP) network, optical network, fiber network, cable network, and/or utility power transmission lines. The system 106 can also be another wireless communication system like system 104, WAN, WLAN, or a BWA network, or any combination of the aforementioned examples, any of which can be used or adapted for voice and/or data communication.

Call Center

The call center 108 provides services to the vehicle 102 by processing and storing data, and communicating with the vehicle 102. The call center 108 can provide back-end functions to the vehicle telematics unit 114 and can include one or more fixed or mobile data centers in one or more locations. The call center 108 can include advisors 142 to monitor various vehicle conditions, respond to service requests, and provide vehicle services such as remote vehicle assistance in connection with in-vehicle safety and security systems. The advisors 142 can be implemented as live human advisors, or as automatons or computer programs responsive to user requests.

The call center 108 includes one or more voice and/or data interfaces 144 such as wired or wireless modems, switches such as private branch exchange (PBX) switches, and/or routers. The interface(s) 144 transmit and receive voice and/or data signals, such as by vehicle data uploads (VDUs), between the vehicle telematics unit 114 and the call center 108 through one or both of the communications systems 104, 106. For data-over-voice communication, the interface(s) 144 preferably apply some type of encoding or modulation to convert digital data for communication with a vocoder or speech codec.

The call center 108 can further include one or more communication service managers 146, one or more servers 148 to process data, one or more suitable databases 150 to store user data such as subscriber profiles and authentication data, and any other suitable data. The call center 108 can also include one or more wired and/or wireless networks 152 such as a LAN or WLAN, for connecting the call center components together along with the any computer(s) used by the one or more advisors 142. For example, the servers 148 and databases 150 execute and store one or more control programs and data to enable a method of speech to DTMF generation using sampling rate independent speech recognition or a method of communicating between an automatic speech recognition (ASR) enabled telecommunications system and a DTMF-controlled communications system 111, either alone or in conjunction with the telematics unit 114 of the vehicle 102. In other words, the presently disclosed method can be enabled by the telematics unit 114 of the vehicle 102, by the computing equipment and/or personnel in the call center 108, or by any combination thereof.

DTMF-Controlled Telecommunications Systems

DTMF-controlled telecommunications systems 111 work as automated attendants responding to telephone communication from outside callers and can also be referred to as interactive voice response systems (IVR) that allow a computer to detect voice and DTMF signals during a telephone call. The DTMF-controlled telecommunications system may respond to outside callers with pre-recorded or dynamically generated audio to provide further information to callers. DTMF-controlled telecommunications system responses, such as pre-recorded or dynamically generated audio, or audible signal generated by the system may be described as speech. DTMF-controlled telecommunications systems may be used to control any function where the interface can be broken down to a series of menu choices. Service providers often implement DTMF-controlled telecommunications systems to convey data easily accessed by computers, where data access in desired 24 hours a day and the information requested changes infrequently.

Generally, the DTMF-controlled telecommunications system accepts a phone call from a user and/or another telecommunications system, such as a telematics system. The DTMF-controlled telecommunications system responds with a pre-recorded message asking the user to select options from a voice menu. After the pre-recorded message is played, the caller then may press a number on a telecommunications device keypad to select an option. For instance, the DTMF-controlled telecommunications system may pre-record a question that requires a yes or no reply. After playing the recording to the user, the DTMF-controlled telecommunications system may then prompt the user to press the number one on the telecommunications system keypad to answer "yes" to the prerecorded question or press the number two on the keypad to answer "no." In other embodiments, the DTMF-controlled telecommunications system does not ask for "yes" or "no" answers, but may pre-record a list of options and request the user to enter the number corresponding to the user's desired option. The DTMF-controlled telecommunications system may be used to interact with users who access voicemail boxes, bank account information, and news reports or with any potential user who may obtain information using a telecommunications device.

A user communicates with a DTMF-controlled telecommunications system in several ways. As discussed above, the user may communicate with a DTMF-controlled telecommunications system by pushing keys on a telecommunications device keypad thereby generating distinct DTMF tones. Additionally, the user may communicate with the DTMF-controlled system by speaking into the microphone connected to the vehicle telematics unit, whereby the DTMF-controlled telecommunications system receives the voice communications.

Recognizing speech received from the DTMF-controlled telecommunications system and identifying a speech segment contained in the speech received from the DTMF-controlled telecommunications system that corresponds with at least one keyword associated with user-defined data may be accomplished using a sampling rate independent speech recognition system. A sampling rate independent speech recognition system is an automatic speech recognition system (ASR). In general, a vehicle occupant inputs voice or speech into an ASR for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like. Speech can be live speech from a user, recorded audio or computer-generated audio. Speech can also be any word or combination of words in any language.

Figure 2:
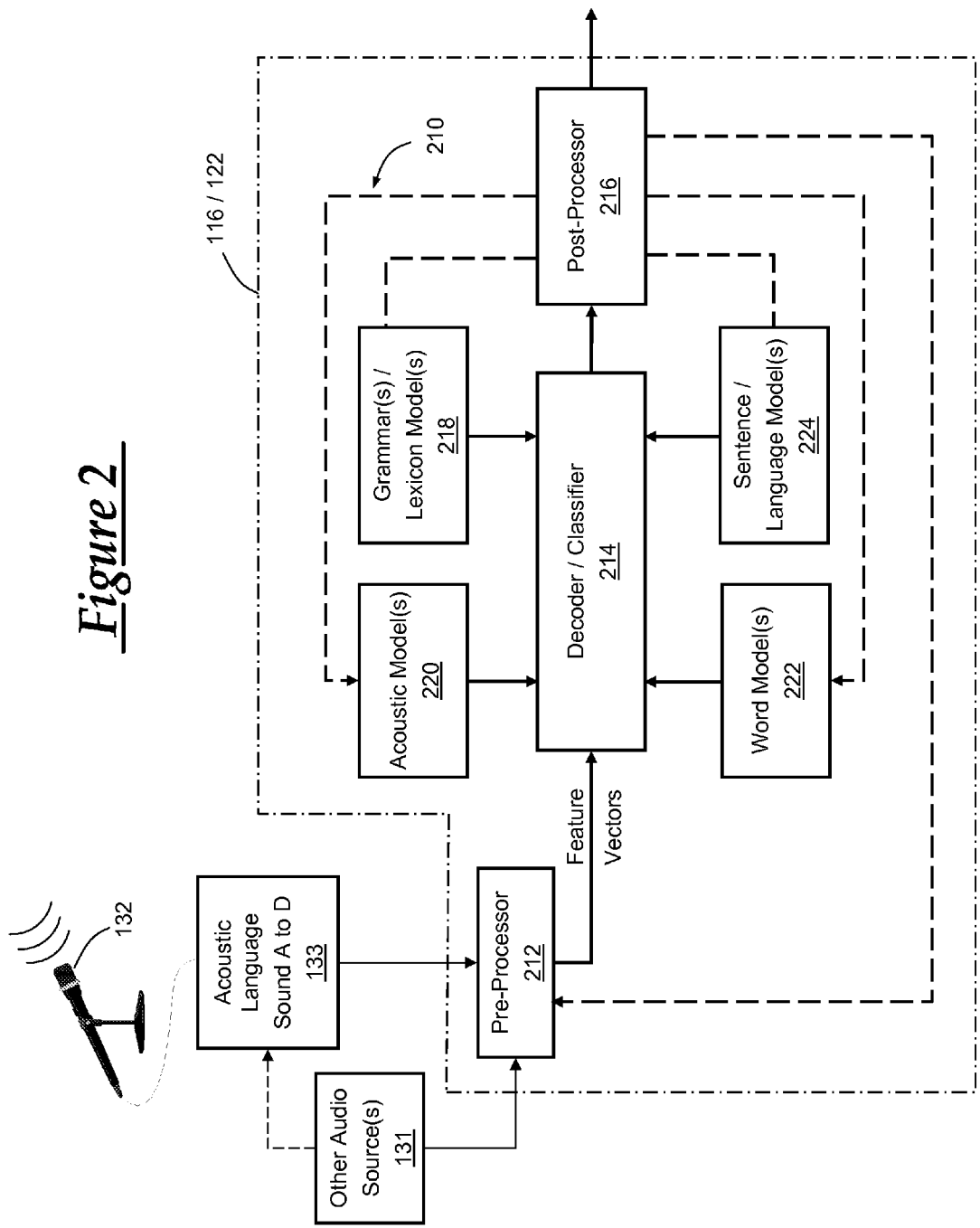
FIG. 2 is a block diagram illustrating an example ASR architecture that can be embedded within the telematics system of FIG. 1 and used to implement exemplary methods of communication.

ASR systems are generally known to those skilled in the art, and FIG. 2 illustrates a specific exemplary architecture for an ASR system 210 that can be used to enable the presently disclosed method. The system 210 includes a device to receive speech such as the telematics microphone 132 or other audio source 131, and an acoustic interface 133 such as a sound card of the telematics user interface 128 to digitize the speech into acoustic data. The system 210 also includes a memory such as the telematics memory 122 for storing the acoustic data and storing speech recognition software and databases, and a processor such as the telematics processor 116 to process the acoustic data. The processor functions with the memory and in conjunction with the following modules: a front-end processor or pre-processor software module 212 for parsing streams of the acoustic data of the speech into parametric representations such as acoustic features; a decoder software module 214 for decoding the acoustic features to yield digital subword or word output data corresponding to the input speech utterances; and a post-processor software module 216 for using the output data from the decoder module 214 for any suitable purpose.

One or more modules or models can be used as input to the decoder module 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative exemplary embodiment, some or all of the ASR system 210 can be resident on, and processed using, computing equipment in a location remote from the vehicle 102 such as the call center 108. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software can be processed using processors of one of the servers 148 in the call center 108. In other words, the ASR system 210 can be resident in the telematics system 114 or distributed across the call center 108 and the vehicle 102 in any desired manner.

First, acoustic data is extracted from human speech wherein a vehicle occupant speaks into the microphone 132, which converts the utterances into electrical signals and communicates such signals to the acoustic interface 133. A sound-responsive element in the microphone 132 captures the occupant's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 133 converts the analog electrical signals into digital electronic signals. The digital data are binary bits which are buffered in the telematics memory 122 and then processed by the telematics processor 116 or can be processed as they are initially received by the processor 116 in real-time.

Second, the pre-processor module 212 transforms the continuous stream of digital speech data into discrete sequences of acoustic parameters. More specifically, the processor 116 executes the pre-processor module 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module 214 to process the incoming feature vectors of each test pattern. The decoder module 214 is also known as a recognition engine or classifier, and uses stored known reference patterns of speech. Like the test patterns, the reference patterns are defined as a concatenation of related acoustic frames and corresponding parameters. The decoder module 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMMs for a sequence of subwords can be concatenated to establish word HMMs.

The speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of a word or subword and can be based on particular speakers, speaking styles, and audible environmental conditions. Those skilled in the art will recognize that reference patterns can be generated by suitable reference pattern training of the ASR system 210 and stored in memory. Those skilled in the art will also recognize that stored reference patterns can be manipulated, wherein parameter values of the reference patterns are adapted based on differences in speech input signals between reference pattern training and actual use of the ASR system 210. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words or speech segments with input from the word models 222 and to construct sentences with the input from the language models 224.

Finally, the post-processor software module 216 receives the output data from the decoder module 214 for any suitable purpose. For example, the post-processor module 216 can be used to convert acoustic data into text or digits for use with other aspects of the ASR system 210 or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212.

Methods of Speech to DTMF-Generation

After recognizing the speech and identifying a word or speech segment, at least one DTMF signal is transmitted to the DTMF-controlled telecommunications system in response to the received speech. A DTMF signal may be transmitted during a call by pressing keypad buttons on a telecommunications device. In general, a DTMF signal corresponds to each keypad button on the telecommunications device. Keypad buttons are laid out in a three by four arrangement, containing numbers 0-9, a pound key and an asterisk. Pressing each button will send a sinusoidal tone of two frequencies, a low frequency and a high frequency, to the DTMF-controlled telecommunications system. Additionally, many telecommunications devices, such as a telematics unit 114, may directly generate the DTMF signals, or the pressing of each button may signal a device such as the telematics processor 116 to generate the signals in response to user actuation. The sinusoidal tone of two frequencies may then be decoded at the DTMF-controlled telecommunications system to determine the button pressed by the user.

A method of speech to DTMF generation using sampling rate independent speech recognition includes receiving speech from a DTMF-controlled telecommunications system, recognizing the speech received from the DTMF-controlled telecommunications system using sampling rate independent speech recognition, identifying a speech segment contained in the speech received from the DTMF-controlled telecommunications system that corresponds with at least one keyword associated with user-defined data, and transmitting at least one DTMF signal to the DTMF-controlled telecommunications system in response to the speech received from the DTMF-controlled telecommunications system using the user-defined data.

Figure 3:
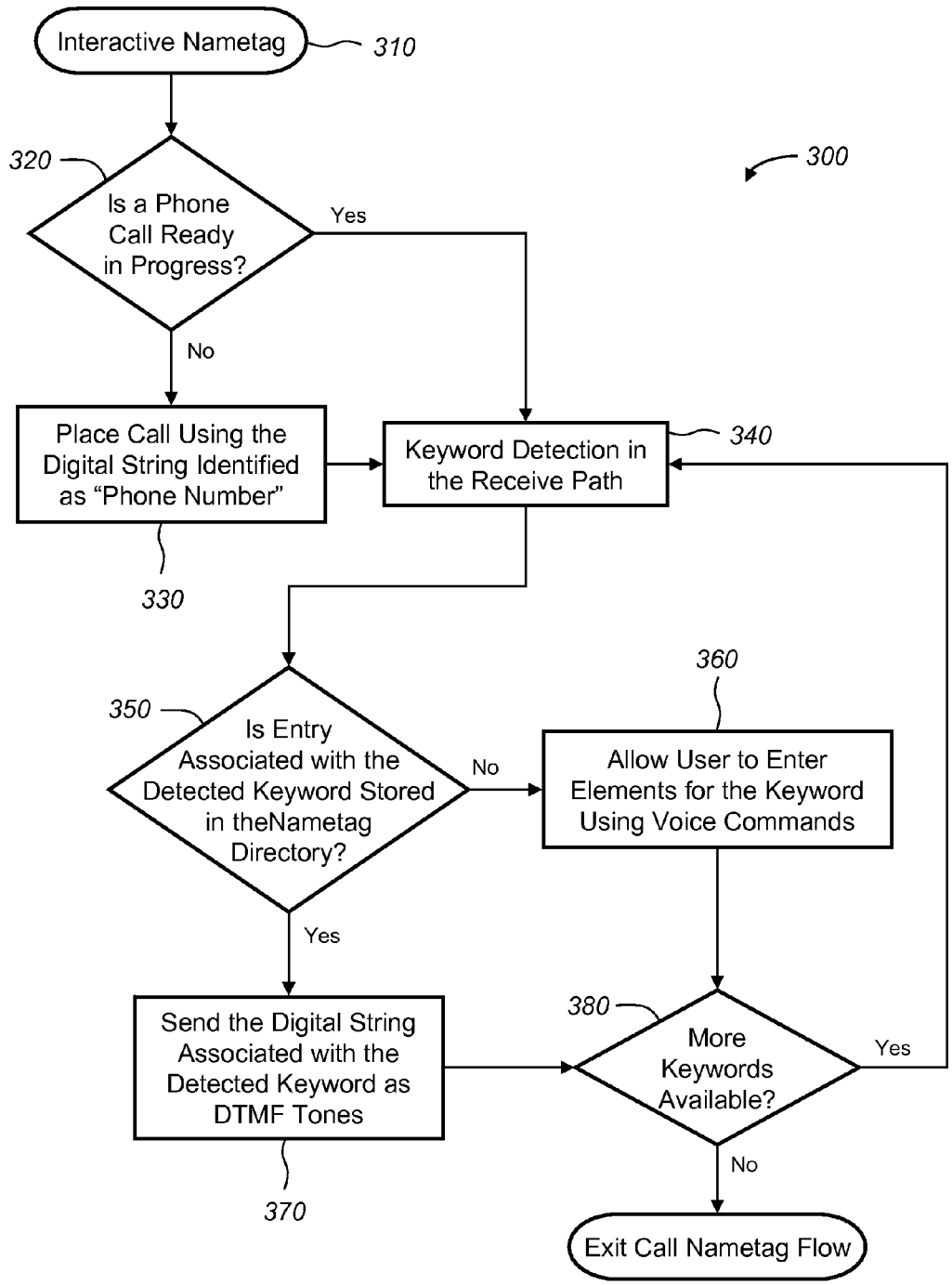
FIG. 3 is a flow chart illustrating a method of speech to DTMF generation using sampling rate independent speech recognition.

An exemplary embodiment of the method of speech to DTMF generation using sampling rate independent speech recognition 300 is shown in FIG. 3. The method can begin at step 310 where an interactive nametag can be stored in the telematics unit 114. The nametag may include keywords and data associated with the keywords. For instance, keywords could include such words as "phone number," "mailbox number," and "passcode." The keywords may be alpha-numeric in composition and act as an identifier for associated data. Each keyword may be associated with data they describe. For example, developing the above keyword examples, the keywords "phone number," "mailbox number," and "passcode" may be associated with data fields such as "3135551212," "#70735," and "4444" respectively. The associated data may be numeric, alphanumeric, or use special characters such as # or *. Many other keywords and associated data combinations are possible and the combinations would depend on the data required for a user to access a DTMF-controlled telecommunications system. Additionally, each nametag may be distinguished by a title. The title may be descriptive, or simply an arbitrary name given to identify the nametag. This title may be verbalized by the user so the ASR system 210 recognizes the title, associating the title with the appropriate nametag and accessing the associated data. Once the interactive nametag is created, the method progresses to step 320.

At step 320, it is determined whether a phone call is in progress. If it is determined that a telecommunications device, such as the telematics unit 114, is not presently connected to a DTMF-controlled telecommunications system the method proceeds to step 330.

At step 330, a nametag can be accessed and an appropriate phone number may be acquired. Accessing the phone number may be accomplished by searching for a particular keyword known to associate with telephone number data, such as "telephone number," and reading the data associated with that keyword. Once the telephone number is accessed, the telecommunications device or telematics unit may telephone the DTMF-controlled telecommunications system and establish communication. Alternatively, if it is determined that a telecommunications device, such as a telematics unit 114, is presently connected to a DTMF-controlled telecommunications system the method proceeds to step 340.

At step 340, the system has already established that the telecommunications device is connected with the DTMF-controlled telecommunications system. At this time, the telecommunications device, or telematics unit 114 can wait to receive speech from the DTMF-controlled telecommunications system. The method can then proceed to step 350.

At step 350, a speech segment or word contained in the speech received can be identified. For example, attempts may be made to match the speech segment or word with at least one keyword associated with user-defined data stored in the nametag. The speech segment or word can be identified using the sampling-rate independent ASR system 210 described above. In operation, speech can be received at a telecommunications device and parsed by the sampling-rate independent ASR system 210. The system can attempt to extract speech segments or words from the incoming speech. Speech segments can be words or combinations of words that match or substantially match keywords stored in the nametag. If the sampling-rate independent ASR system 210 matches a keyword with a speech segment, but the keyword does not have any data associated with it, the method proceeds to step 360.

At step 360, the method allows the user to enter data that would respond to a detected speech segment. For instance, if the sampling-rate independent ASR system 210 matches a keyword with speech or a speech segment received from the DTMF-controlled telecommunications system, but the keyword is not associated with any data, the user may be prompted to enter data corresponding to the speech or speech segment detected from the DTMF-controlled telecommunications system. The user may enter data by speaking into the microphone, pressing buttons on a keypad, or any other method suitable to communicate the user's wishes to the DTMF-controlled telecommunications system. On the other hand, if the sampling-rate independent ASR system 210 detects a speech segment or word that matches or substantially matches a keyword, and the keyword is associated with data, the method progresses to step 370.

At step 370, the data associated with the keyword stored in the nametag matching the detected speech segment is sent via the wireless communication device or telematics unit to the DTMF-controlled telecommunications system. The data is sent using the wireless communications system 104, or other suitable wireless communications method known to those skilled in the art. After the data is sent, the method progresses to step 380.

At step 380, it is determined using the ASR system 210, if more speech segments or words have been identified as matching keywords from a nametag. If it is determined that speech segments or words, in addition to those already associated with keywords in step 350, match additional keywords, the method moves to step 340. If the sampling-rate independent ASR system has not identified anymore speech segments or words, or not identified any speech segments or words that match or substantially match keywords stored in a nametag, the method ends at step 390.

Figure 4:
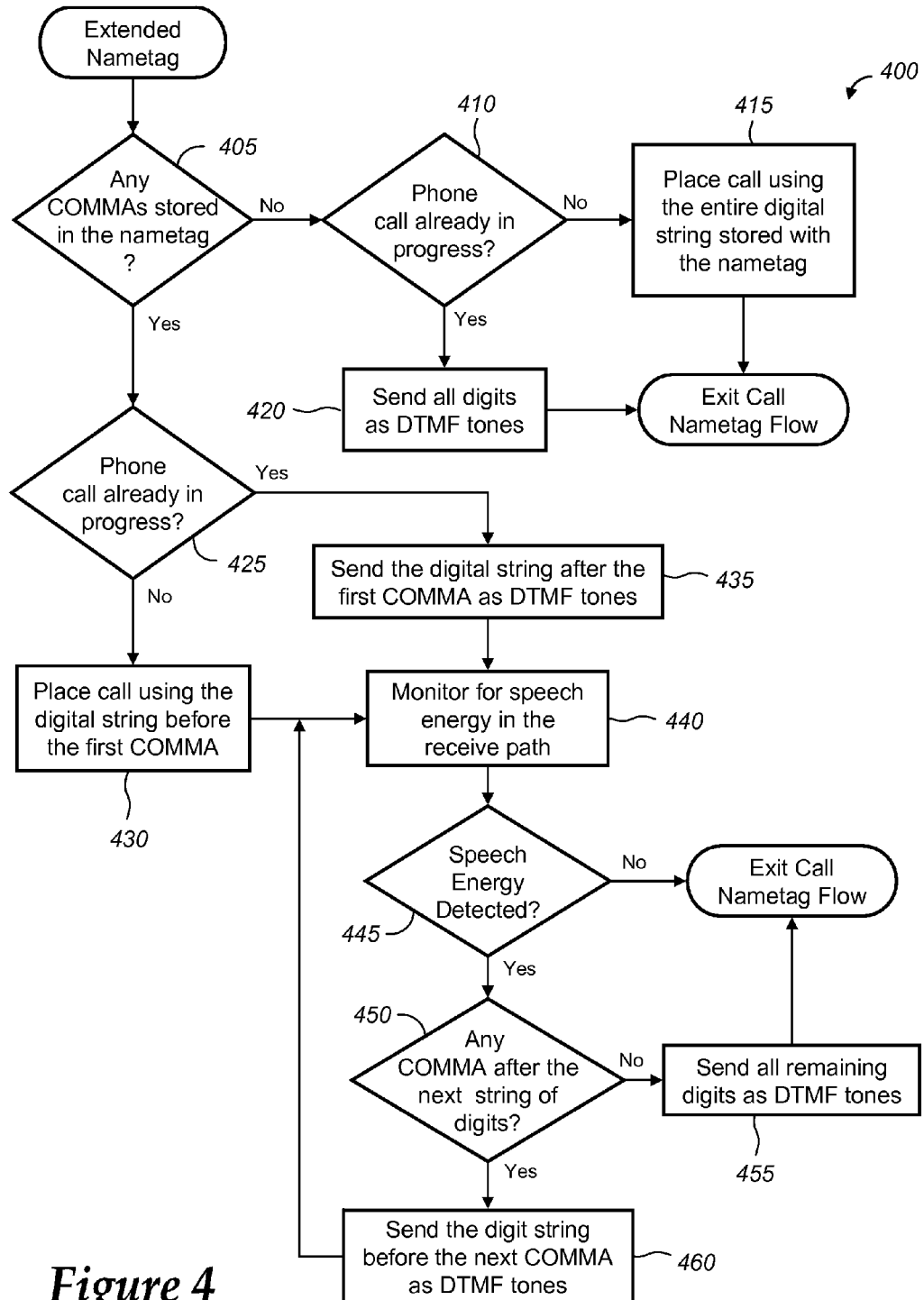
FIG. 4 is a flow chart depicting a method of communicating between an automatic speech recognition (ASR) enabled telecommunications system and a DTMF-controlled communications system.

FIG. 4 shows an exemplary embodiment of the method of communicating between an automatic speech recognition (ASR) enabled telecommunications system and a DTMF-controlled communications system 111. The method 400 may use nametags as described above, or may use nametags to store data without keywords. Rather, the nametag may use a title identifying the nametag to the user and then the user may store data associated with the nametag in memory 122 or any other suitable place capable of storing data. The data associated with the nametag may be stored as a data string, such as an ordered sequence of numbers, characters, symbols or any other data. Multiple data categories that may comprise the data string may be separated in the string by delimiters. Additionally, a data string may be comprised of only one piece of data. In such cases delimiters denoting the end of one data entry and the beginning of another data entry may not be necessary. A delimiter may be a comma, period, dash or any other character or symbol capable of denoting the ending or beginning of a data entry. For instance, a nametag may have a title "Work Phone." In the nametag, numerous data entries may be stored and separated by commas. The nametag "Work Phone" may contain the data string "3135556565, #, 76543, 1111." Or the data string may contain only "3135556565."

At step 405, the nametag is searched to detect the presence of any delimiters (in this case, commas) to determine if there are more than one piece of data associated with the nametag. If the nametag does not contain any commas, the method proceeds to step 410.

At step 410, it is determined if a phone call is in progress. Determining whether or not a phone call is in progress may ensure that the telecommunications device or telematics unit knows if it needs to dial a phone number. If a phone call is not in progress the method proceeds to step 415 and the telecommunications device or telematics unit accesses the data associated with the nametag and uses the data to place a telephone call. Since commas were not detected in the nametag, the only piece of data stored in the nametag is the phone number. After the phone number is dialed, the method ends. If at step 410 it is determined that a phone call is already in progress, the method proceeds to step 420.

At step 420, the telecommunications device or telematics unit sends the entire contents of the nametag as DTMF signals and the method ends. Since commas were not found in the nametag and a phone call is already in progress, the user may have stored only account or password information in the nametag. The telecommunications device or telematics unit sends the nametag contents in a similar manner as described above. If it is determined at step 405 that there are commas stored in the nametag, then the method proceeds to step 425.

At step 425, it is determined if a phone call is in progress. This is accomplished in a similar manner as step 410. If a phone call is not in progress the method proceeds to step 430 and the telecommunications device or telematics unit 114 accesses the data associated with the nametag and may use the data positioned before the first comma to place a telephone call to the DTMF-controlled telecommunications system. At this time, the method progresses to step 440. Alternatively, if it is determined that a phone call is in progress, the method skips step 430 and proceeds to step 435.

At step 435, the telecommunications device or telematics unit sends the data in the data string stored in the nametag after the first comma to the DTMF-controlled telecommunications system. The data may be sent as DTMF tones or DTMF signals over the wireless communications system 104 or using any other wireless communication system know to those skilled in the art. After the data has been sent, the method proceeds to step 440.

At step 440, the telecommunications device or telematics unit waits to receive speech energy from the DTMF-controlled telecommunications network. Speech energy may be detected using an automatic speech recognition (ASR) system or any device capable of sensing speech energy. Techniques for determining the presence or level of speech energy are known to those skilled in the art. The speech energy detection system may compensate to ignore sound or noise, such as ringback tones, that may not be categorized as speech. The method then proceeds to step 445.

At step 445, it is determined whether or not speech energy is detected. If no speech energy is detected, the method ends. But if speech energy is detected, the method proceeds to step 450.

At step 450, it is determined whether a comma is positioned or stored after the next data entry in the data string stored in the nametag. Determining whether a comma is positioned or stored after the next data entry in the data string stored in the nametag may help the telematics unit or telecommunications device to determine whether additional data needs to be sent to the DTMF-controlled telecommunications system or whether all of the data has been sent and the method may end. If it is determined that additional commas are not positioned after the next data entry, then the telecommunications device or telematics unit sends all of the data from the nametag as DTMF tones and the method ends. If it is determined that commas are positioned after the next data entry, then the method proceeds to step 460.

At step 460, the data entry before the next comma is sent to the DTMF-controlled telecommunications system. Similar to step 455, data may be sent to the DTMF-controlled communication system. The data stored in the data string before the next comma is sent and afterwards the method proceeds to step 440 and repeats until commas are no longer detected in the data string.

As will be appreciated by those skilled in the art, the use of the disclosed system and method enables use of an ASR system, such as are found in vehicle telematics systems, to automatically supply some or all of the needed responses to a DTMF-controlled system. In this way, a driver in a vehicle can access a DTMF-controlled system (such as a DTMF-controlled voice mail system) from their vehicle's integrated telematics system and use that telematics system to automatically provide the DTMF responses needed to dial, supply a mailbox number or password, and/or initiate the playback of voice mail messages left for the vehicle driver.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of speech to DTMF generation using sampling rate independent speech recognition, comprising:
   (a) receiving speech from a DTMF-controlled telecommunications system;
   (b) recognizing the speech received from the DTMF-controlled telecommunications system using sampling rate independent speech recognition;
   (c) identifying a speech segment contained in the speech received from the DTMF-controlled telecommunications system that corresponds with at least one keyword associated with user-defined data; and
   (d) transmitting at least one DTMF signal to the DTMF-controlled telecommunications system in response to the speech received from the DTMF-controlled telecommunications system using the user-defined data.

2. The method set forth in claim 1, further comprising recording the user-defined data, which corresponds to information used to communicate with the DTMF-controlled telecommunications system, wherein the user-defined data includes delimited data fields.

3. The method set forth in claim 2, wherein a first field of the delimited data fields includes a telephone number to access the DTMF-controlled telecommunications system.

4. The method set forth in claim 2, further comprising storing the recorded user-defined data in a telematics unit using automatic speech recognition.

5. The method set forth in claim 2, further comprising sending the user-defined data through a web portal to a call center and sending the user-defined data from the call center to a telematics unit.

6. The method of claim 1, wherein the user-defined data includes a telephone number and at least one of a mailbox number, a pass code, or an account number.

7. The method of claim 1, wherein the at least one keyword of step (a) describes user-defined data.

8. The method of claim 1, wherein the speech segment contained in the speech received from the DTMF-controlled telecommunications system in step (c) comprises at least one word substantially matching the at least one keyword.

9. A method of communicating between an automatic speech recognition (ASR) enabled telecommunications system and a DTMF-controlled communications system, comprising:
   (a) establishing communication between the ASR-enabled telecommunications system and the DTMF-controlled communications system;
   (b) detecting a presence of speech energy at the ASR-enabled telecommunications system from the DTMF-controlled communications system;
   (c) detecting an absence of the speech energy at the ASR-enabled telecommunications system from the DTMF-controlled communications system; and
   (d) transmitting at least one DTMF signal from the ASR-enabled telecommunications system to the DTMF-controlled telecommunications system in response to the detected absence of speech energy.

10. The method of claim 9, further comprising recording a nametag corresponding to delimited data fields used to communicate with the DTMF-controlled telecommunications system, wherein the delimited data fields correspond to a plurality of DTMF signals for transmitting in response to the absence of speech energy.

11. The method of claim 10, wherein transmitting at least one DTMF signal further comprises sending the plurality of DTMF signals.

12. The method of claim 10, further comprising recording the nametag and corresponding delimited data fields in a telematics unit using automatic speech recognition.

13. The method of claim 10, further comprising creating the nametag and corresponding delimited data fields using a web portal in communication with a call center and sending the nametag and corresponding delimited data fields from the call center to a telematics unit.

14. The method of claim 10, wherein the plurality of DTMF signals includes a telephone number, and at least one of a mailbox number, a pass code, or an account number.

15. The method of claim 10, wherein if the DTMF-controlled telecommunications system requires information not contained in the nametag, the ASR-enabled system prompts a user to input the data.

16. The method of claim 9, wherein a user-supplied telephone number is used to establish communications between the ASR-enabled telecommunications system and the DTMF-controlled communications system.

17. The method of claim 9, further comprising determining whether a phone call is in progress.

18. The method of claim 10, further comprising placing a call using a data field stored in the nametag.

19. The method of claim 10, further comprising sending the delimited data fields stored in the nametag to the DTMF-controlled communications system.

* * * * *